Feb. 27, 1940.   W. B. OSBORNE   2,191,543
TRANSMISSION CONTROL
Filed Nov. 1, 1937   4 Sheets-Sheet 1
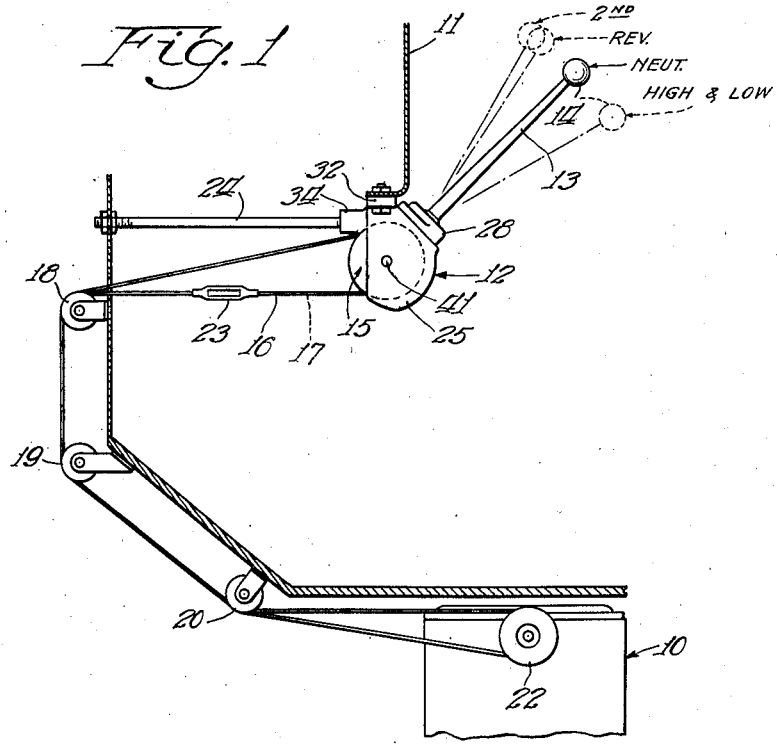
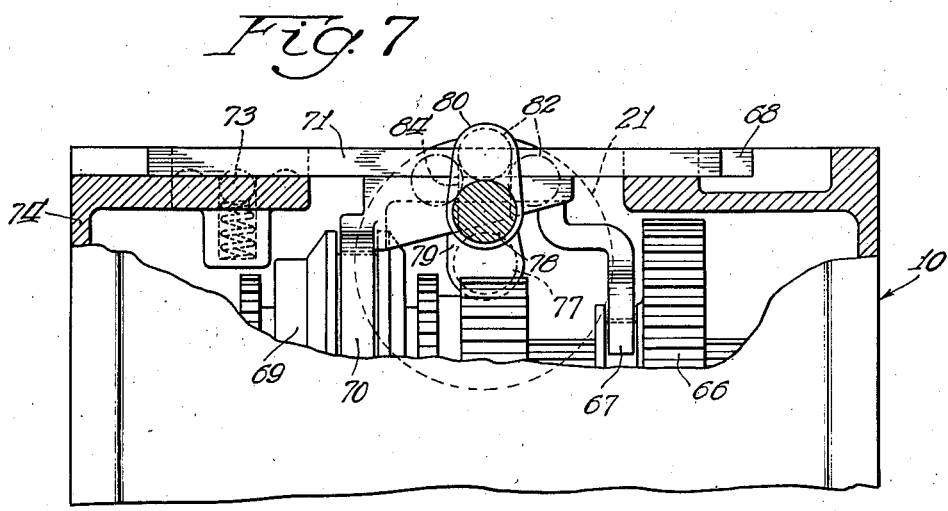
Inventor:
William B. Osborne
By: Edward C. Gritzbaugh
Atty.

Feb. 27, 1940. W. B. OSBORNE 2,191,543
TRANSMISSION CONTROL
Filed Nov. 1, 1937 4 Sheets-Sheet 2
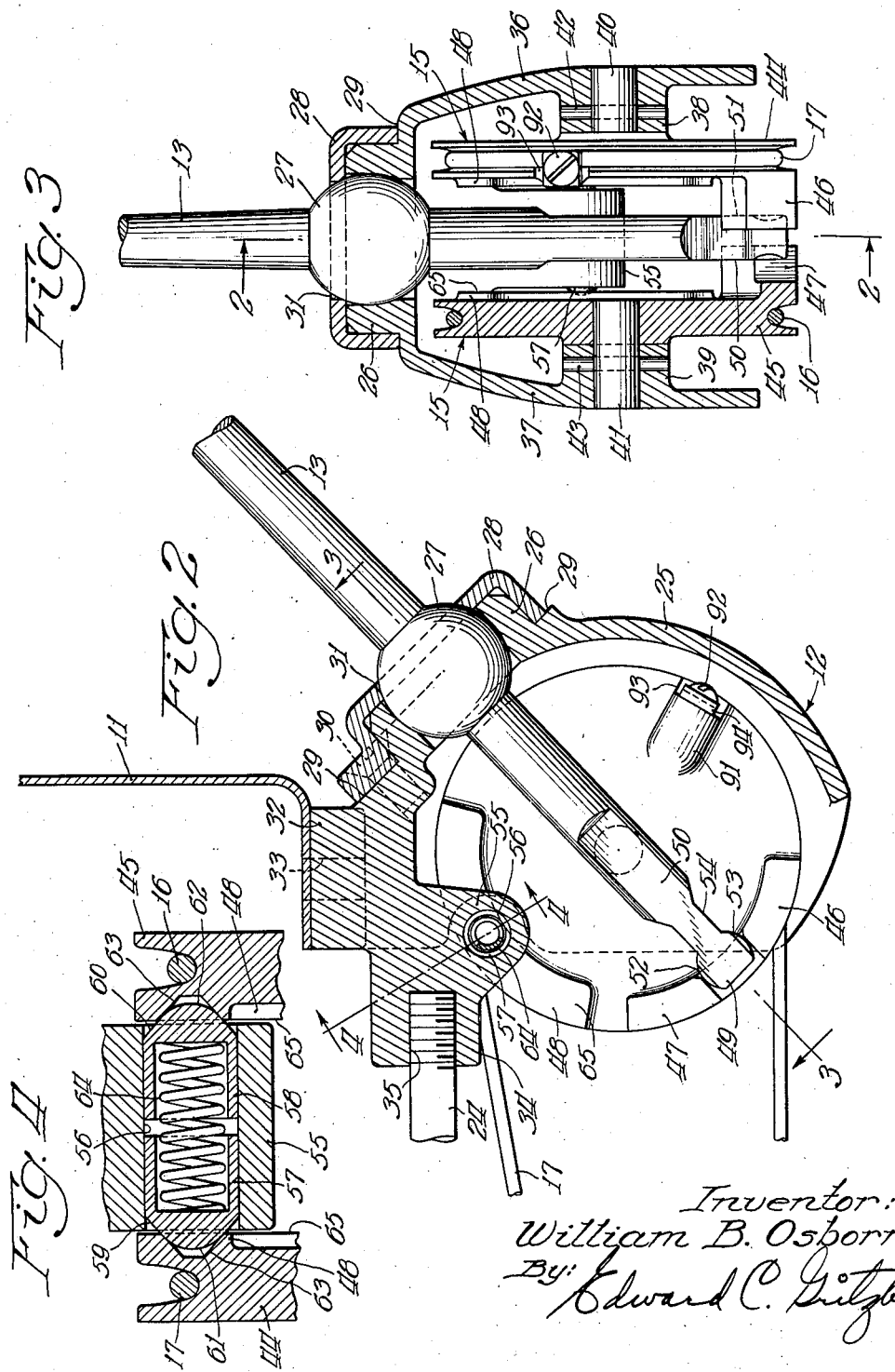
Inventor:
William B. Osborne
By: Edward C. Gritzbaugh
Atty.

Inventor:
William B. Osborne
By: Edward C. Fitzbaugh
Atty.

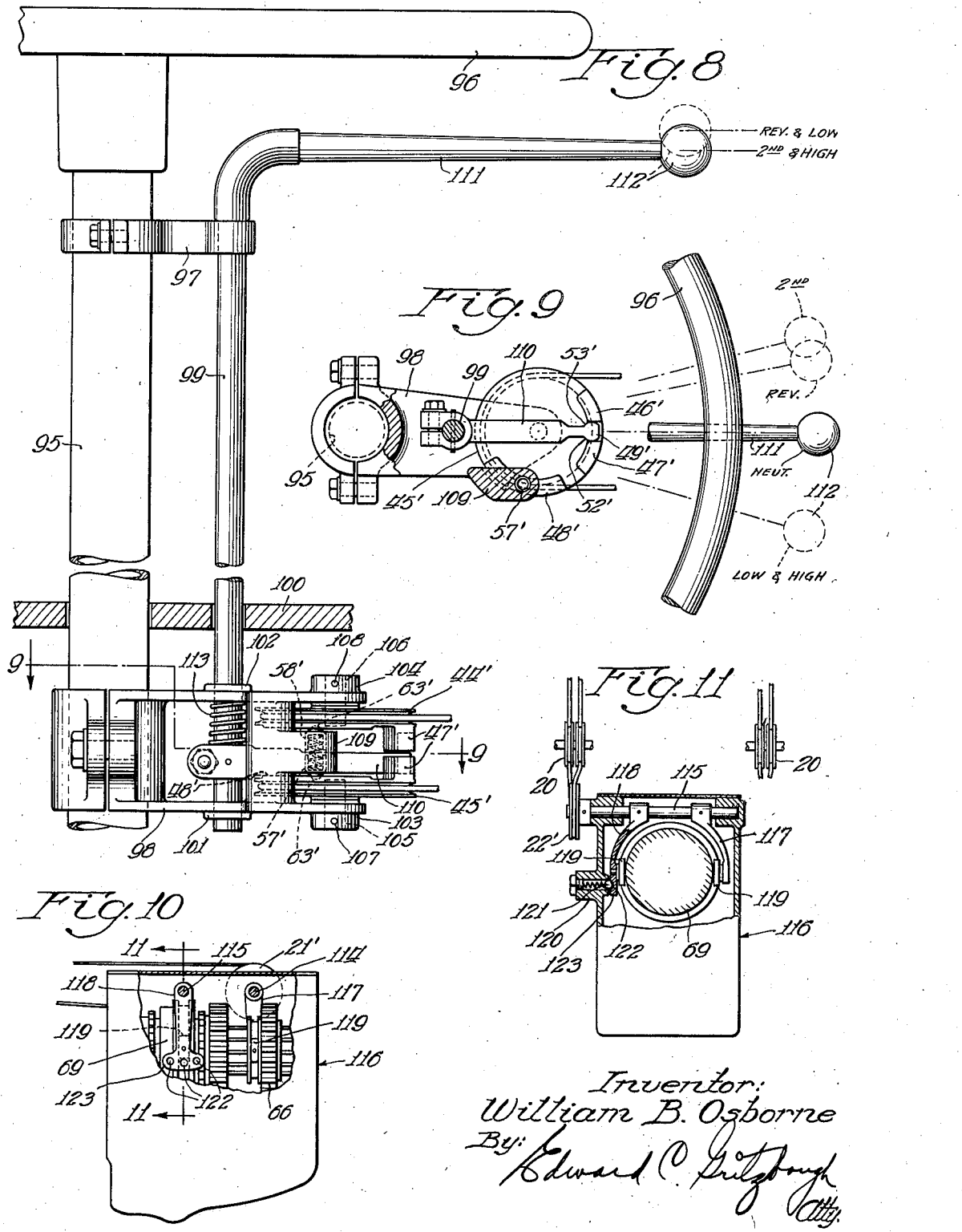

Patented Feb. 27, 1940

2,191,543

UNITED STATES PATENT OFFICE 2,191,543

TRANSMISSION CONTROL

William B. Osborne, Muncie, Ind., assignor to Borg-Warner Corporation, Chicago, Ill., a corporation of Illinois Application November 1, 1937, Serial No. 172,117

19 Claims. (Cl. 74—473)

This invention relates to speed ratio changing devices such as automobile transmissions, and particularly to controls therefor.

The principal object of this invention is to provide a mechanical remote control for a speed ratio changing device which may be located so as to be accessible to an operator without interfering with his movements.

Another object of this invention is to provide a control for a speed ratio changing device which is positive in its action, but which nevertheless does not transmit noise from the speed ratio changing device to the point of control.

Another object is to provide a remote control for a speed ratio changing device which is not dependent upon an auxiliary source of energy for its operation.

These and other objects will become apparent from the following detailed description when taken together with the accompanying drawings which form a part thereof, and in which Fig. 1 is an elevation of one form of remote control.

Fig. 2 is a section through the control of Fig. 1.

Fig. 3 is a front elevation in section of the control taken along line 3—3 of Fig. 2.

Fig. 4 is an enlarged section through a position determining means used in the control.

Fig. 7 is a fragmentary side elevation, partly in section, of the speed ratio changing device of Fig. 5.

Fig. 8 is an elevation of another form of remote control embodying the features of this invention.

Fig. 9 is a view of the control taken in the plane of the steering wheel of Fig. 8.

Fig. 10 is a fragmentary side elevation of another form of speed ratio changing device to which this invention may be applied; and Fig. 11 is an end elevation, partly in section, of the speed ratio changing device of Fig. 10.

Figure 5:
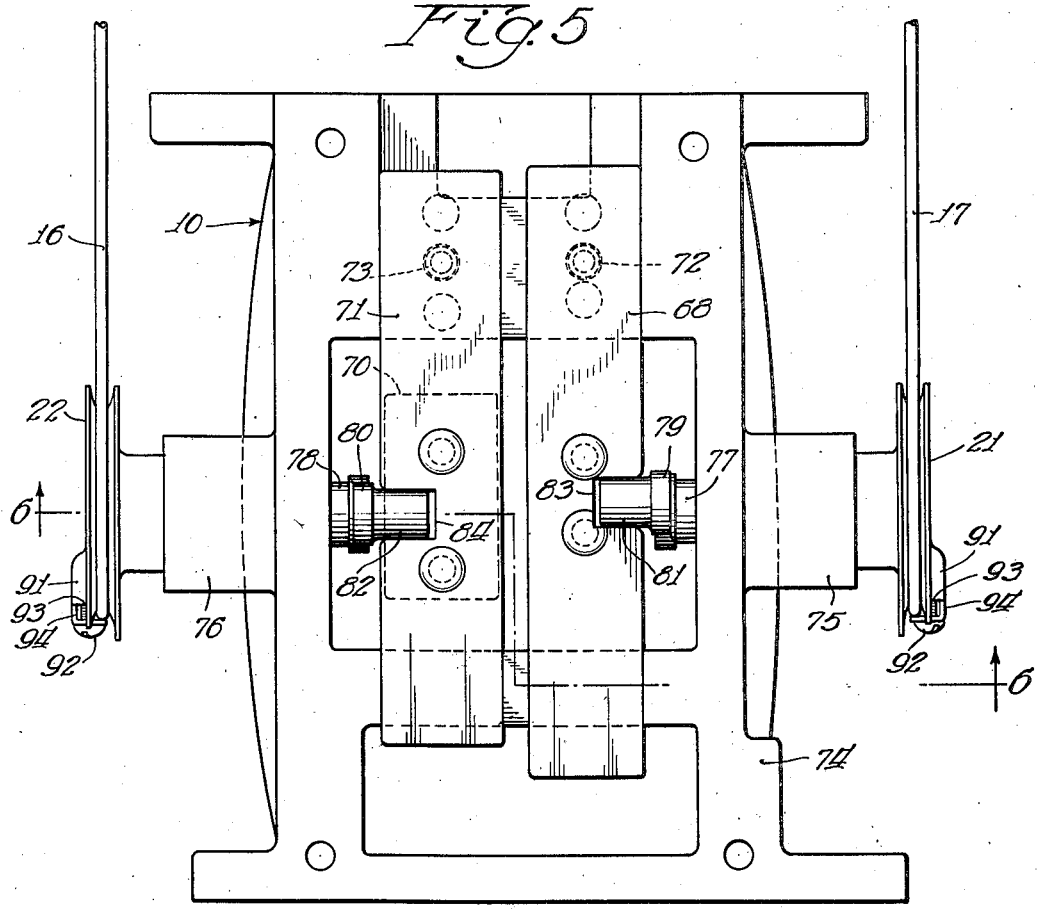
Fig. 5 is a plan view of a speed ratio changing device to which the novel control has been attached.

For purposes of illustration, the invention will be described as applied to an automobile transmission. It is understood, however, that it is not limited to such application, but may be used wherever the speed ratio through a geared device is to be controlled from a distance.

In its broadest aspects, this invention comprises a pair of spaced, oscillatable members connected by means of cables to the shiftable elements of a transmission, and a control lever capable of translating the normal gear-shifting motions into oscillations which are transmitted to the shiftable elements of the transmission to effect a change in gear ratio. Thus, the control may comprise a pair of spaced pulleys, a lever pivoted at some point outside the diameter of the pulleys and capable of oscillating the pulleys individually a predetermined amount, and bringing one to rest at a definite point prior to crossing over and engaging the other. At the transmission, corresponding pulleys are secured to shafts which rock shift forks to effect the speed ratio changes, or to shift rails in the transmission through cranks secured to the shafts. The cables are clamped to the pulleys to prevent slipping.

Referring now to the drawings for a detailed description of the invention, there is shown in outline at 10 in Fig. 1 a fragment of a gear box or transmission containing the usual gears for effecting low, intermediate and high speed ratios as well as neutral and reverse. Above transmission 10 is an instrument panel or dash 11 to which is bolted a control designated generally by the reference character 12. Said control 12 is provided with a short lever 13 the end 14 of which describes a series of motions which correspond to the motions of a standard gear shift lever in effecting neutral, low, intermediate, high and reverse speed ratios. Operatively connectible with lever 13 is a pair of spaced pulleys designated generally by reference character 15 around which are passed cables 16, 17 which then pass over direction changing pulleys 18, 19 and 20 to corresponding pulleys 21 and 22 (Fig. 5) on the sides of transmission 10. Each cable is provided with a tightening means such as a turnbuckle 23 and is clamped to the control and transmission pulleys in a manner hereinafter to be described to insure positive action. The number and location of direction changing pulleys can be altered so that the cables will clear all essential and fixed portions of the car. Control 12 is braced horizontally by a tie rod 24 which is secured at its left end (Fig. 1) to a rigid portion (not shown) of the car.

Referring now to Figs. 2, 3 and 4 for a detailed description of control 12, 25 is a casing having an apertured boss 26, the aperture of which is machined to form a socket for a ball 27 on lever 13. Boss 26 is provided with a cap 28 which abuts shoulders 29 on housing 25, and is secured thereto by suitable machine screws 30. Said cap 28 is apertured at 31, the diameter of the aperture being less than the greatest diameter of ball 27, so that cap 28 serves to maintain ball 27 in its socket in boss 26. In the control shown, boss 26 is disposed angularly with respect to the plane of dash 11, but it is understood that the angle of the boss relative to housing 25 may be altered so that the axis of boss 26 is parallel to the plane of dash 11, or at right angles thereto, or at any angle with respect to these two positions deemed desirable or necessary.

Adjacent boss 26 is a second boss 32 which is apertured at 33 to receive bolts (not shown) for securing housing 25 to dash 11. A third boss 34 is drilled and tapped at 35 to receive a tie rod 24 for bracing said housing in a horizontal direction as previously described.

The sides 36 and 37 of housing 25 are provided with coaxial internal bosses 38 and 39 which are apertured to receive pulley axles 40 and 41. Said pulley axles are maintained in place in housing 25 by pins 42 and 43 which pass through aligned apertures in the bosses and their respective axles.

Mounted on each axle 40 and 41 is a pulley 44 and 45 respectively, internal bosses 38 and 39 being of such length that the pulleys are in spaced relation. Each pulley is provided with circumferential lugs 46, 47 and 48 extending into the space between the pulleys. The end 49 of lever 13 is formed with flat sides 50 and 51 and with spherical edges 52 and 53 which are made possible by a reduction in width at 54. The space between lugs 46 and 47 is such that when end 49 of lever 13 is inserted therein, spherical surfaces 52 and 53 are in contact with the lugs 46 and 47 to provide a driving connection with the pulley with a minimum of backlash.

Lugs 48 do not extend inwardly as far as lugs 46 and 47, and are adapted to include between them an internal boss 55 on housing 25 adjacent boss 34. Said boss 55 is provided with a machined aperture 56 within which are located plungers 57 and 58. The plungers may be made identical for ease of manufacture and are formed with conical ends 59 and 60 which blend into spherical tips 61 and 62. Lugs 48 are provided with centrally located frusto-conical depressions 63 which act as seats for the ends of plungers 57 and 58. Suitable means, such as spring 64, is inserted between plungers 57 and 58 to urge them outwardly toward pulleys 44 and 45. The spring shown is a helical spring, and accordingly the plungers are hollowed out to provide space for the spring.

The length of the plungers is important. The distance between the inner ends of the plungers when both are fully seated in depressions 63 is equal to the total axial travel of one of the plungers from its seated position to the position wherein it rides upon the outer surface 65 of lug 48. By this construction, the plungers perform the usual functions of poppets and in addition prevent simultaneous rotation of both pulleys with respect to boss 55, since both plungers cannot be retracted at the same time. This latter function is used to prevent an inadvertent simultaneous shift into more than one speed ratio.

Figure 6:
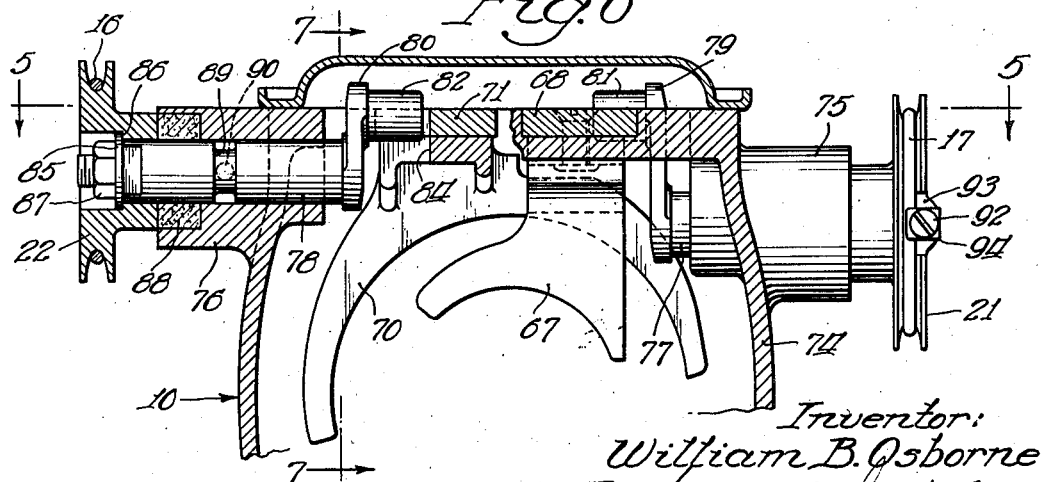
Fig. 6 is a fragmentary end elevation in section of the speed ratio changing device of Fig. 5.

Reference is now made to Figs. 5 to 7 inclusive for the details of the pulley mechanism at the transmission.

Some manufacturers prefer that equipment other than standard be made optional, that is, that transmissions adapted for standard control be supplied for a given car as well as transmissions designed for remote control. To reduce the cost of optional equipment, therefore, it is desirable to supply a transmission which is for the most part standard, but which nevertheless may be readily converted to the form required for the optional control. Thus the transmission may comprise the usual reverse, neutral and first speed gear 66 which is shiftable by a fork 67 attached to a shift rail 68, and a synchromesh shift between first and second and second to high, similarly operated by a shift fork 70, secured to a shift rail 71. Standard poppets 72 and 73 may be provided for shift rails 68 and 71, respectively. Transmission housing 74 may be standard in every respect except that it is provided with bosses 75 and 76. If standard equipment is desired, the bosses are not machined or drilled. If the remote control construction is desired, said bosses are drilled to receive pulley shafts 77 and 78, the inner ends of which are secured to cranks 79 and 80, respectively. The ends 81 and 82 of cranks 79 and 80 cooperate with slots 83 and 84, respectively, in shift rails 68 and 71. Pulleys 21 and 22 are secured to the outer ends of shafts 77 and 78 in any suitable manner, as, for example, by threading the ends of said shafts and providing a washer 85 which bears against a shoulder 86 on each pulley, a nut 87 being used to provide the requisite pressure. Packing 88 is used between the shafts and housing to prevent loss of lubricant from transmission housing 74. Each shaft has a peripheral groove 89 which cooperates with a pin 90 in the bosses to prevent axial movement of the shaft.

Each of the pulleys 21, 22, 44 and 45 is provided with a boss 91 which is drilled and tapped to receive a machine screw 92. The sides of the pulleys are cut away at the boss as at 93 (Fig. 6) and a clamp 94 is inserted between screw 92 and the pulley to secure the cooperating cable to the pulley.

The operation of the control is as follows:

Lever 13 is shown in Fig. 1 in its neutral position, that is, the position in which both plungers 57 and 58 are seated in depressions 63 in pulleys 44 and 45. In this position the lugs 46, 47 and 48 on pulleys 44 and 45 are aligned. To shift into first from neutral, lever 13 is moved perpendicularly to the plane of Fig. 1 and then downwardly, thereby engaging lug 47 on pulley 44, and rotating said pulley clockwise (Fig. 2). This clockwise rotation of pulley 44 is transmitted through cable 17 secured thereto to pulley 21 at the transmission. Said pulley 21 rotates crank 79 and thereby moves shift rail 68 to shift gear 66 to its first speed position. Since the distance travelled by shift rail 68 in shifting the gear is greater than the distance travelled by shift rail 71 to operate the synchromesh device, crank 79 may be made longer than crank 80 so that the movement of the cable is approximately the same for both shifts. While the shift into first is being made, plunger 57 is seated in depression 63 and prevents rotation of pulley 45.

To shift into second from first, lever 13 is moved upward to about one-half of its total throw in that direction, and then through neutral as in the standard shift to cross over and pick up pulley 45, and then upward to the limit of its travel in that direction. This causes end 49 of lever 13 to engage lug 46 on pulley 45, and to rotate said pulley counterclockwise. Such rotation of pulley 45, however, does not take place until plunger 58 is seated in depression 63, that is, until gear 66 is returned to neutral position. The rotation of pulley 45 is transmitted through cable 16 cooperating therewith to pulley 22, which in turn operates crank 80 to shift rail 71 and fork 76

70 attached thereto to effectuate the connection through the second speed gear train. During this time plunger 58 is locked in its seated position by the retracted plunger 57.

To shift into high speed gear from second, lever 13 is pulled downward to the limit of its throw in that direction. This causes end 49 of the lever to cooperate with lug 47 on pulley 45 to rotate said pulley in a clockwise direction (Fig. 2). This motion is again transmitted by the cooperating cable to pulley 22 at the transmission and thence through crank 80 and shift rail 71 to shift fork 70 to effectuate high speed gear connection.

Reverse is obtained by shifting lever 13 through neutral at right angles to the plane of Fig. 1, and then upward, thereby causing end 49 of the lever to pick up lug 46 on pulley 44 and to rotate said pulley counterclockwise. This motion is again transmitted through the cooperating cable to pulley 21 at the transmission, and thence through crank 79 and shift rail 68 to shift fork 67, which thereupon shifts gear 66 to its reverse position.

The cable control just described is applicable with a few modifications to the steering wheel type of control, that is, to the type of gear shift control which is mounted on the steering wheel post. Figs. 8, 9, 10 and 11 show the details of such a construction.

Referring now to Fig. 8, 95 is a steering post of the usual construction on which is mounted a steering wheel 96 and two brackets 97 and 98. Bracket 97 is located near steering wheel 96, and supports a shaft 99, the axis of which may be parallel to the axis of steering post 95. Bracket 98 is secured to steering post 95 below the toe board 100 of the driver's compartment. Said bracket 98 has a pair of coaxial bearings 101 and 102 through which shaft 99 passes and in which said shaft is journalled. Spaced from bearings 101 and 102 are bosses 103 and 104 which are drilled to receive coaxial pulley axles 105 and 106, respectively, said axles being pinned to the bosses at the outer extremities thereof as shown at 107 and 108. Axle 105 supports a pulley 45', and axle 106 supports a pulley 44', said pulleys being identical with pulleys 44 and 45 of Figs. 2 and 3.

An inwardly extending boss 109 is provided in brackets 98, which extends between pulleys 44' and 45' in a manner similar to boss 55 of Figs. 2 and 4. Boss 109 is likewise apertured to receive plungers 57' and 58' which cooperate with depressions 63' in pulleys 44' and 45' to prevent an inadvertent simultaneous shift to more than one gear ratio.

Clamped to shaft 99 between pulleys 44' and 45' is an arm 110, which is shaped similarly to the portion of lever 13 extending below ball 27. Thus, rotation of shaft 99 about its axis permits end 49' of lever 110 to engage lugs 46' and 47' on the pulleys, and axial movement of shaft 99 effects a cross shift from one pulley to another corresponding to a cross shift of the transmission.

Shaft 99 is controlled by a lever 111 extending radially outward and terminating in a ball 112. A coil spring 113 is used between bearing 102 and arm 110 to bias shaft 99 in a downward direction. As in the previous design, pulley 44' operates the first speed and reverse gear of the transmission, and pulley 45' operates the second speed and high synchromesh device. Spring 113, therefore, serves to maintain arm 110 in contact with the pulley that is longest in use.

To operate the control, lever 111 is raised and moved clockwise (Fig. 9) to the limit of its travel in that direction. This causes arm 110 to engage pulley 44' and rotate it clockwise to effectuate the low speed connection. It will be noted that during its clockwise rotation, arm 110 rides on lug 47' of pulley 45'. Plunger 57', however, will remain seated in depression 63' due to the axial movement of plunger 58', and hence rotation of pulley 45' is prevented. To shift into reverse, lever 110 is rotated counter-clockwise through neutral in its raised position to the limit of its travel in that direction. A definite pressure must be exerted upward on lever 111 to effectuate the shift into reverse by reason of the weight of shaft 99 and associated apparatus and also because of spring 113 which tends to depress the lever, as it passes through neutral. This acts as a safeguard against an overshift into reverse from low speed.

To shift into second, lever 111 is rotated to its neutral position, which causes lugs 47' and 46' to become aligned and thereby to permit end 45' of lever 110 to drop to pulley 45'. Lever 111 is then rotated counter-clockwise to the limit of its travel in that direction. This causes pulley 45' to be rotated counter-clockwise and through the cable connection thereto, to effectuate the shift into second speed.

The shift into high is accomplished by rotating lever 111 clockwise to the limit of its travel in that direction. The corresponding clockwise rotation of pulley 45' serves to effectuate the appropriate high speed gear connection of the transmission.

For those installations which do not provide an option between standard shift and remote control shift, the transmission shown in Figs. 10 and 11 may be employed. This differs from the transmission shown in Figs. 5, 6 and 7 in that the shift rails are eliminated and pulleys 21 and 22 operate directly upon pivoted shift forks connected to low and reverse gear 66, and second and high synchromesh 69.

Referring specifically now to Figs. 10 and 11, it will be seen that pulleys 21' and 22' are secured to shafts 114 and 115, respectively, which are journalled in appropriate bearings in housings 116. Clamped to each shaft is a pair of arms 117 and 118 to the ends of which are secured pivoted members 119 which ride in the grooves of shiftable gear 66 and the shiftable element of synchromesh device 69. Oscillating shafts 114 and 115, therefore, oscillate members 117 and 118 to shift gear 66 and synchromesh device 69. A boss 120 may be provided in housing 116 opposite one arm of each of the pair 117 and 118 within which is located a suitable poppet 121 which cooperates with depressions 122 in an enlarged end 123 of said arm. Poppet 121 and depressions 122 determine the neutral and two engaged positions of the member shifted by the arm.

The elimination of the shift rails in the transmission shown in Figs. 10 and 11 simplifies the transmission construction, reduces the cost of the transmission, and also reduces the amount of friction which the remote control must overcome.

It will be apparent that the remote control described removes the control lever for the transmission from the floor of the driver's compartment, and therefore does not impede the movements of the driver or passengers. The control member itself follows standard movements for effecting the various shifts available in the transmission, and hence it is not required that the driver acquire any special technique for controlling the speed of the transmission. Since the cables are clamped to their respective pulleys, the action of the control is positive. The cable and pulley system does not unduly increase the friction in the system, and in actual tests it has been found that substantially no more force is required to effect the shifts with this system than with the direct connected standard gear shift. This is brought about by the use of a minimum number of sliding parts and the use wherever possible of rotating parts which are known to have comparatively little friction. Since the control is connected to the transmission through cables, vibrations and other objectionable noises from the transmission cannot be telephoned to the control and from there to the driver's compartment. The cable connection also permits a very large relative movement between the control and transmission such as is necessary where the engine of a car is flexibly mounted with respect to the body of the car.

It will be noted that cranks 79 and 80 when operated are turned sufficiently to present considerable resistance to return movement of the cooperating shift rails. It is possible by this means to eliminate the poppets at the rails and to use this resistance to maintain the rails in their operative positions.

It is understood that either of the controls shown may be used with either type of transmission, or with transmissions which do not employ synchromesh shifts.

It is understood further that the foregoing description is merely illustrative of a preferred embodiment or embodiments of the invention, and that the scope of the invention, therefore, is not to be limited thereto, but is to be determined by the appended claims.

I claim:

1. A control for a shiftable transmission device comprising spaced pulleys, means connecting the pulleys with the shiftable transmission device, a support for said pulleys, said support including a boss extending between said pulleys, and means in said boss for preventing simultaneous rotation of the pulleys to prevent a simultaneous double shift of the transmission device.

2. A control for a shiftable transmission device comprising a housing, spaced pulleys in the housing, means connecting said pulleys with the shiftable transmission device, a boss on the housing extending between said pulleys and means in said boss for preventing simultaneous rotation of said pulleys to prevent a simultaneous double shift of the transmission device.

3. A control for a shiftable transmission device comprising spaced pulleys, spaced lugs on the opposed faces of the pulleys, means connecting the pulleys with the transmission device, means selectively engaging the lugs on the pulleys for oscillating the pulleys to effect a shift in the transmission, and means for aligning the lugs of the pulleys when said pulleys are positioned for neutral to permit a cross shift of the lug engaging means from one pulley to the other.

4. A control for a shiftable transmission device as described in claim 3, said last mentioned means comprising a fixed member projecting into the space between the pulleys, said pulleys having depressions, and resiliently mounted members in said fixed member adapted to engage said depressions when the pulleys are positioned for neutral.

5. A control for a shiftable transmission device comprising spaced pulleys, means connecting said pulleys to the shiftable transmission device, lugs on the pulleys projecting into the space between the pulleys, and means pivoted at a point outside the space defined by the pulleys and adapted selectively to engage the lugs on the pulleys to oscillate the pulleys, whereby to shift the transmission device.

6. A control for a shiftable transmission device comprising spaced pulleys, means connecting said pulleys to the shiftable transmission device, lugs on the pulleys projecting into the space between the pulleys and substantially filling said space thereat, and means pivoted at a point outside the space defined by the pulleys and adapted selectively to engage the lugs to oscillate the pulleys, whereby to shift the transmission, said lugs being spaced circumferentially upon the pulleys and adapted to be aligned to permit said engaging means to cross over from one pulley to the other.

7. A control as described in claim 6, said shiftable device having a neutral position, and means for aligning said lugs when the shiftable device is in its neutral position.

8. A control as described in claim 6, and means for preventing a simultaneous double shift of the transmission device.

9. A control for a speed changing device comprising a housing removed from the speed changing device, a pair of spaced pulleys in the housing, corresponding pulleys at the speed changing device and operatively connected thereto to effectuate a change in speed by an oscillatory motion, continuous flexible means passing over each one of the pair of pulleys in the housing and over the corresponding pulleys at the speed changing device, means for securing said flexible means to the pulleys to obtain positive drive connections therebetween, and means for selectively driving the pulleys in the housing to effectuate a change in the speed changing device.

10. In combination a housing for a transmission control, spaced pulleys within the housing, a lever for selectively oscillating said pulleys, said housing including aligned internally projecting supports for the pulleys, an inclined ball seat for the lever, a boss supporting said housing, a second boss for bracing said housing, a third boss projecting between the pulleys, and means in said third boss for preventing simultaneous rotation of the pulleys.

11. In combination a support for a transmission control adapted to be located near the steering wheel of an automobile, spaced pulleys operatively associated with said support and a lever for selectively oscillating said pulleys, said support including a bracket, means on said bracket for attaching said support to a steering wheel post, aligned internally projecting supports for the pulleys, a boss projecting between the pulleys, and means in the boss for preventing simultaneous rotation of said pulleys.

12. A control for a shiftable transmission device to be used in conjunction with a steering wheel and steering wheel post, comprising spaced pulleys having axes parallel to the axis of the steering wheel, lugs on the pulleys projecting into the space between the pulleys, a lever pivoted outside the diameter of the pulleys and projecting between the pulleys selectively to engage the lugs on the pulleys whereby to oscillate said pulleys, continuous cable means connecting the pulleys with the transmission to effect shifts therein, a lever supported from the steering wheel post in the vicinity of the steering wheel, and means connecting the lever at the steering wheel with the lever between the pulleys, whereby motion of the steering wheel lever may be translated to shifting movements at the transmission.

13. A control for a shiftable transmission device to be used in conjunction with a steering wheel and steering wheel post, said control comprising a bracket secured to the steering wheel post, spaced pulleys having axes parallel to the axis of the steering wheel, aligned supports for the pulleys, lugs on the pulleys projecting into the space between the pulleys, a lever pivoted outside the diameter of the pulleys and adapted selectively to engage the lugs on the pulleys to oscillate said pulleys, means connecting the pulleys with the transmission to effect shifts therein and a rod connected to said lever and projecting upward to the vicinity of the steering wheel and then outwardly thereof to control the movements of the lever, said rod being adapted to move axially to determine which of the pulleys shall be operative.

14. A control for a shiftable transmission device to be used in conjunction with a steering wheel and steering wheel post, said control comprising a bracket secured to the steering wheel post, spaced pulleys having axes parallel to the axis of the steering wheel, aligned supports for the pulleys, lugs on the pulleys projecting into the space between the pulleys, a lever pivoted outside the diameter of the pulleys and adapted selectively to engage the lugs on the pulleys to oscillate said pulleys, means connecting the pulleys with the transmission to effect shifts therein, a rod connected to said lever and projecting upward to the vicinity of the steering wheel and then outwardly thereof to control the movements of the lever, said rod being adapted to move axially to determine which of the pulleys shall be operative, and means for urging the rod axially in the direction of the pulley which is normally most in use.

15. A housing for a transmission control, spaced pulleys within the housing, and a lever for selectively oscillating said pulleys, said housing including aligned internally projecting supports for the pulleys, an inclined ball seat for the lever located outside the space defined by the pulleys to reduce the throw of the free end of the lever, and a boss supporting the housing.

16. A control for a shiftable transmission device comprising spaced pulleys, means connecting said pulleys to the shiftable transmission device, lugs on the pulleys projecting into the space between the pulleys and substantially filling the space thereat, and means pivoted at a point outside the space defined by the pulleys and adapted selectively to engage the lugs to oscillate the pulleys, whereby to shift the transmission, said lugs being spaced circumferentially upon the pulleys and extending a distance substantially equal to the maximum travel of the engaging means.

17. A control for a speed changing device comprising a housing removed from the speed changing device, a pair of spaced pulleys in the housing, corresponding pulleys at the speed changing device and operatively connected thereto to effectuate a change in speed by an oscillating motion, continuous flexible means passing over each one of the pair of pulleys in the housing and over the corresponding pulleys at the speed changing device, means for securing said flexible means to the pulley to obtain positive drive connections therebetween, and a lever pivoted outside the diameter of the pulleys and adapted selectively to engage and oscillate the pulleys whereby to effect a change in the speed changing device.

18. A transmission comprising shiftable elements for effecting speed changes, slidable rails secured to the shiftable elements, a housing for the transmission, oscillatable cranks pivoted in the housing and operating directly upon the rails, said cranks when operated being adapted to assume an angle with respect to the rails such that normal shifting forces transmitted to the rails from the shiftable elements will be ineffective to turn the cranks and means external to the housing for selectively rotating said cranks to effect shifts in the transmission, said last mentioned means comprising pulleys secured to the cranks, corresponding pulleys located at a point remote from said transmission, continuous flexible means connecting each crank pulley with its corresponding remote pulley and means for selectively oscillating said remote pulleys.

19. A transmission comprising shiftable elements for effecting speed changes, slidable rails secured to the shiftable elements, a housing for the transmission, oscillatable cranks pivoted in the housing and operating directly upon the rails, said cranks when operated being adapted to assume an angle with respect to the rails such that normal shifting forces transmitted to the rails from the shiftable elements will be ineffective to turn the cranks, and means external to the housing for selectively rotating said cranks to effect shifts in the transmission, said last mentioned means comprising pulleys secured to the cranks, corresponding pulleys located at a point remote from said transmission, continuous flexible means passing over each crank pulley and its corresponding remote pulleys, and a pivoted lever adapted selectively to engage and drive said remote pulleys, said lever being pivoted outside the diameter of the remote pulleys to decrease the throw of the free end of said lever.

WILLIAM B. OSBORNE.